United States Patent
Ettl et al.

(10) Patent No.: US 6,576,086 B1
(45) Date of Patent: Jun. 10, 2003

(54) METHOD FOR PRODUCING PAPER, PAPERBOARD AND CARDBOARD USING AN UNCROSSLINKED FIXING AGENT DURING PAPER STOCK DRAINING

(75) Inventors: Roland Ettl, Haβloch (DE); Hubert Meixner, Ludwigshafen (DE); Anton Esser, Mannheim (DE); Rainer Scholz, Dannstadt-Schauernheim (DE); Norbert Mahr, Ludwigshafen (DE); Ulrich Steuerle, Heidelberg (DE); Matthias Höne, Nuβloch (DE); Klaus Lorenz, Worms (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/403,769

(22) PCT Filed: Apr. 24, 1998

(86) PCT No.: PCT/EP98/02446

§ 371 (c)(1),
(2), (4) Date: Nov. 2, 1999

(87) PCT Pub. No.: WO98/50630

PCT Pub. Date: Nov. 12, 1998

(30) Foreign Application Priority Data

May 6, 1997 (DE) .......................... 197 19 059

(51) Int. Cl.[7] .................. D21C 21/10; D21C 21/14; D21C 21/16
(52) U.S. Cl. ................ 162/164.3; 162/164.6; 162/167; 525/540; 528/332; 528/403
(58) Field of Search ................ 162/72, 164.3, 162/164.6, 167; 528/271, 295.5, 332, 392, 403; 525/418, 540

(56) References Cited

U.S. PATENT DOCUMENTS

| | | | |
|---|---|---|---|
| 3,923,745 A | | 12/1975 | Dumas |
| 4,902,779 A | * | 2/1990 | Waldmann .................. 528/422 |
| 5,145,559 A | | 9/1992 | Auhorn et al. |
| 5,536,370 A | * | 7/1996 | Scherr et al. ............ 162/164.3 |
| 5,554,261 A | * | 9/1996 | Nilz et al. ................ 162/168.2 |

FOREIGN PATENT DOCUMENTS

| | | |
|---|---|---|
| DE | 33 01 670 A | 7/1984 |
| EP | 0 649 941 A | 4/1995 |
| EP | 0 674 046 A | 9/1995 |
| JP | 03 294 596 A | 12/1991 |
| WO | WO 94 12560 A | 6/1994 |
| WO | WO 97 05330 A | 2/1997 |
| WO | 97/05330 * | 2/1997 |

* cited by examiner

Primary Examiner—Steve Alvo
(74) Attorney, Agent, or Firm—Oblon, Spivak, McClelland, Maier & Neustadt, P.C.

(57) ABSTRACT

Paper, board and cardboard are produced by draining paper stock containing interfering substances in the presence of fixing agents by a process in which the fixing agents used are reaction products which are obtainable by reacting amino- and/or ammonium-containing polymers selected from the group consisting of the polymers containing vinylamine units polyalkylene polyamines polyamidoamines ethyleneimine-grafted polyamidoamines which may be crosslinked, polydiallyldimethylammonium chlorides polymers containing dialkylaminoalkylacrylamide units or dialkylaminoalkylmethacrylamide units and polyallylamines and dicyandiamide and formaldehyde condensates with reactive sizes for paper in a weight ratio of polymer to reactive size of from 15,000:1 to 1:1, and the reaction products thus obtainable are used as fixing agents for water-soluble and for water-insoluble interfering substances in the production of paper, board and cardboard from paper stocks containing interfering substances.

7 Claims, No Drawings

METHOD FOR PRODUCING PAPER, PAPERBOARD AND CARDBOARD USING AN UNCROSSLINKED FIXING AGENT DURING PAPER STOCK DRAINING

The present invention relates to a process for the production of paper, board and cardboard by draining a paper stock, containing interfering substances, in the presence of fixing agents.

EP-A-0 438 707 discloses a process for the production of paper, board and cardboard by draining a paper stock, containing interfering substances, in the presence of fixing agents and cationic retention aids, fixing agents used being hydrolyzed, homo- and/or copolymers of N-vinylformamide having a degree of hydrolysis of at least 60%. In the production of paper, water is used, in practice, and is at least partially or completely recycled from the paper machine. This is either clarified or unclarified white water or a mixture of such water qualities. The recycled water contains larger or smaller amounts of interfering substances, which are known to impair the efficiency of cationic retention and draining aids to a very great extent. The interfering substances may be water-soluble or colloidal substances and water-insoluble products.

Owing to the reuse of fibers from waste paper for the production of paper, board and cardboard, water-insoluble tacky impurities, ie. stickies and white pitch (binders originating from paper slips), enter the water circulation of the paper machine and thus cause production problems. The tacky impurities are preferentially deposited on wires, felts, rolls and other moving parts of the paper machine. If the procedure is carried out in the absence of fixing agents as process assistants, the presence of interfering substances may become evident in various ways. For example, defects form in the paper web, generally in the form of thin patches or even holes, which may cause tears in the paper machine or in the printing press.

In addition to resins and lignin components which are dissolved out of the wood during fiber production by boiling and mechanical processing, possible sources of interfering substances for stickies are mainly dispersions, natural colloidal systems, such as starch, casein and dextrin, and hotmelt adhesives. Specifically, these are resins, lignin residues, adhesives from the gluing of book spines, adhesives from pressure-sensitive adhesive labels and envelopes, and white pitch. The tacky impurities are in most cases removed only to an insufficient extent from the mixture during the processing of waste paper fibers. In order to reduce the tack of the undesired impurities, substances having a large surface area, eg. talc, chalk or bentonite, have long been added to the paper stock. It is intended thereby substantially to reduce the tack of the tacky impurities, cf. Tappi Press 1990, Vol. 2, pages 508 and 512. The disadvantage of this treatment of tacky impurities is the sensitivity to shearing and the limited retention of the particles treated in this manner in papermaking. Occasionally used dispersants, such as ligninsulfonates, naphthalenesulfonates, nonylphenols or alkoxylated fatty alcohols, prevent agglomeration of stickies to form particles having a size troublesome for the papermaking process, but considerable frothing of the paper stocks occasionally occurs with the use of these process assistants.

EP-A-0 649 941 discloses a process for controlling the settling of tacky impurities out of paper stock suspensions. Polymers which contain N-vinylformamide units, alkyl-substituted N-vinylcarboxamide units or the vinylamine units formed therefrom by hydrolysis are used for inhibiting the deposition of white pitch. EP-A-0 061 169 discloses that cationic polyelectrolytes, which are obtainable by reacting, for example, polyethyleneimine or polyvinylamine with benzyl chloride or styrene oxide and in which at least 10% of the aminoalkyl groups carry an aromatic substituent, are used for removing anionic substances from water circulations in papermaking.

WO-A-94/12560 discloses condensates of polyalkylenepolyamines, which are obtainable by partial amidation of polyalkyleneamines with carboxylic acids, carboxylic esters, carboxylic anhydrides or carbonyl halides and crosslinking of the partially amidated polyalkylenepolyamines with at least bifunctional crosslinking agents, from 0.001 to 10 parts by weight of a crosslinking agent being used per part by weight of the partially amidated polyalkylenepolyamines. These condensates are used as drainage aids, flocculants and retention aids and as fixing agents in the production of paper.

It is an object of the present invention to provide, for the papermaking process, fixing agents which fix both water-soluble interfering substances and colloidal interfering substances as well as water-insoluble tacky impurities to the paper fibers.

We have found that this object is achieved, according to the invention, by a process for the production of paper, board and cardboard by draining a paper stock, containing interfering substances, in the presence of fixing agents, the fixing agents used being reaction products which are obtainable by reacting amino- and/or ammonium-containing polymers selected from the group consisting of the polymers containing vinylamine units polyalkylenepolyamines ethyleneimine-grafted polyamidoamines which may be crosslinked polydiallyldimethylammonium chlorides polymers containing dialkylaminoalkylacrylamide units or dialkylaminomethacrylamide [sic] units and polyallylamines and dicyandiamide and formaldehyde condensates with reactive sizes for paper in a weight ratio of polymer to reactive size of from 15,000:1 to 1:5.

The present invention furthermore relates to the use of reaction products which are obtainable by reacting amino- and/or ammonium-containing polymers selected from the group consisting of the polymers containing vinylamine units polyalkylenepolyamines ethyleneimine-grafted polyamidoamines which may be crosslinked, polydiallyldimethylammonium chlorides polymers containing dialkylaminoalkylacrylamide units or dialkylaminomethacrylamide [sic] units and polyallylamines and dicyandiamide/formaldehyde condensates with reactive sizes for paper in a weight ratio of polymer to reactive size of from 15,000:1 to 1:5, as fixing agents for water-soluble and for water-insoluble interfering substances in the production of paper, board and cardboard from paper stocks containing interfering substances.

Suitable fibers for the production of the pulps are all qualities commonly used for this purpose, e.g. mechanical pulp, bleached and unbleached chemical pulp and paper stocks obtained from all annual plants. Mechanical pulp includes, for example, groundwood, thermomechanical pulp (TMP), chemothermomechanical pulp (CTMP), pressure groundwood, semi-chemical pulp, high-yield pulp and refiner mechanical pulp (RMP). Examples of suitable chemical pulps are sulfate, sulfite and soda pulps. The unbleached chemical pulps, which are also referred to as unbleached kraft pulp, are preferably used. Suitable annual plants for the production of paper stocks are, for example, rice, wheat, sugarcane and kenaf.

Waste paper alone or as a mixture with other fibers is also used for the production of the pulps. Waste paper includes coated waste, which, owing to the content of binders for coating and printing inks, gives rise to white pitch. The adhesives originating from pressure-sensitive adhesive labels and envelopes and adhesives from the glueing of book binds as well as hot melts, give rise to the formation of stickies.

The stated fibers can be used alone or as a mixture of one another. The pulps of the type described above contain varying amounts of water-soluble and water-insoluble interfering substances. Interfering substances can be quantitatively determined, for example, with the aid of the COD or with the aid of the cationic demand. For the purposes of the invention cationic demand is that amount of a cationic polymer which is necessary to bring a defined amount of the white water to the isoelectric point. Since the cationic demand depends to a very great extent on the composition of the cationic polymer used in each case for the determination, a condensate obtained according to Example 3 of DE-B-2 434 816 and obtainable by grafting a polyamidoamine of adipic acid and diethylenetriamine with ethyleneimine and subsequently crosslinking with a polyethylene glycol dichloride ether is used for standardization. The pulps containing interfering substances have, for example, a COD of from 300 to 40,000, preferably from 1000 to 30,000, mg of oxygen per kg of the aqueous phase and a cationic demand of more than 50 mg of the stated cationic polymer per liter of white water.

The amino- and/or ammonium-containing polymer used as starting materials for the preparation of fixing agents are known. They are, for example, synthetic cationic compounds, such as polymers containing vinylamine units. They are prepared, for example, starting from open-chain N-vinylcarboxamides of the formula

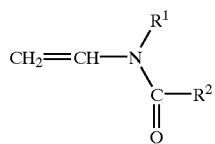

(I)

where $R^1$ and $R^2$ may be identical or different and each hydrogen or $C_1$–$C_6$-alkyl. Suitable monomers are, for example, N-vinylformamide ($R^1$=$R^2$=H in formula I), N-vinyl-N-methylformamide, N-vinylacetamide, N-vinyl-N-methylacetamide, N-vinyl-N-ethylacetamide, N-vinyl-N-methylpropionamide and, N-vinylpropionamide. For the preparation of the polymers, the stated monomers can be polymerized either alone, as a mixture of one another or together with other mono-ethylenically unsaturated monomers. Homo- or copolymers of N-vinylformamide are preferably used as starting materials. Polymers containing vinylamine units are disclosed, for example, in U.S. Pat. No. 4,421,602, EP-A-02 16 387 and EP-A-0 251 182. They are obtained by hydrolyzing polymers which contain monomers of the formula I as polymerized units with acids, bases or enzymes.

Suitable monoethylenically unsaturated monomers which are copolymerized with the N-vinylcarboxamides are all compounds copolymerizable therewith. Examples of these are vinyl esters of saturated carboxylic acids of from 1 to 6 carbon atoms, such as vinyl formate, vinyl acetate, vinyl propionate and vinyl butyrate, and vinyl ethers, such as $C_1$–$C_6$-alkyl vinyl ethers, eg. methyl or ethyl vinyl ether. Further suitable comonomers are ethylenically unsaturated $C_3$–$C_6$-carboxylic acids, for example acrylic acid, methacrylic acid, maleic acid, crotonic acid, itaconic acid and vinylester [sic] acid, and their alkali metal and alkaline earth metal salts, esters, amides and nitriles of the stated carboxylic acids, for example methyl acrylate, methyl methacrylate, ethyl acrylate and ethyl methacrylate. Further suitable carboxylic esters are derived from glycols or polyalkylene glycols, only one OH group being esterified in each case, eg. hydroxyethyl acrylate, hydroxyethyl methacrylate, hydroxypropyl acrylate, hydroxybutyl acrylate, hydroxypropyl methacrylate, hydroxybutyl methacrylate and acrylic monoesters of polyalkylene glycols having a molar mass of from 500 to 10,000. Further suitable comonomers are esters of ethylenically unsaturated carboxylic acids with amino alcohols, for example dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, dimethylaminobutyl acrylate and diethylaminobutyl acrylate. The basic acrylates can be used in the form of the free bases, of the salts with mineral acids, such as hydrochloric acid, sulfuric acid or nitric acid, of the salts with organic acids, such as formic acid, acetic acid or propionic acid, or of sulfonic acids or in quarternized form. Suitable quarternizing agents are for example dimethyl sulfate, diethyl sulfate, methyl chloride, ethyl chloride and benzyl chloride.

Further suitable comonomers are amides of ethylenically unsaturated carboxylic acids, such as acrylamide and methacrylamide, and N-alkylmonoamides and N-alkyldiamides of monoethylenically unsaturated carboxylic acids having alkyl radicals of 1 to 6 carbon atoms, eg. N-methylacrylamide, N,N-dimethylacrylamide, N-methylmethacrylamide, N-ethylacrylamide, N-propylacrylamide and tert-butylacrylamide, and basic (meth)acrylamides, eg. dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Other suitable comonomers are N-vinylpyrrolidone, N-vinylcaprolactam, acrylonitrile, methacrylonitrile, N-vinylimidazole and substituted N-vinylimidazoles, eg. N-vinyl-2-methylimidazole, N-vinyl-4-methylimidazole, N-vinyl-5-methylimidazole, N-vinyl-2-ethylimidazole and N-vinylimidazolines, such as N-vinylimidazoline, N-vinyl-2-methylimidazoline and N-vinyl-2-ethylimidazoline. N-vinylimidazoles and N-vinylimidazolines are used not only in the form of the free bases but also in the form neutralized with mineral acids or organic acids or in quaternized form, the quaternization preferably being effected with dimethyl sulfate, diethyl sulfate, methyl chloride or benzyl chloride. Diallyldialkylammonium halides, eg. diallyldimethylammonium chlorides [sic], are also suitable.

Other suitable comonomers are sulfo-containing monomers, for example vinylsulfonic acid, allylsulfonic acid, methallylsulfonic acid, styrenesulfonic acid, the alkali metal and ammonium salts of these acids and 3-sulfopropyl acrylate. Further modification of the polymers containing vinylamine units can be achieved by incorporating, as polymerized units, up to 5 mol % of units of monomers having at least two ethylenically unsaturated double bonds. Such comonomers are usually used as crosslinking agents in copolymerization. The presence of these comonomers during the copolymerization results in an increase in the molar masses of the copolymers. Suitable compounds of this type are, for example, methylenebisacrylamide, esters of acrylic acid and methacrylic acid with polyhydric alcohols, eg. glycol diacrylate, glyceryl triacrylate, glycol dimethacrylate, glyceryl trimethacrylate and other polyols, such as pentaerythritol and glucose, which are at least diesterified with acrylic acid or methacrylic acid. Suitable crosslinking agents are also divinylbenzene, divinyldioxane, pentaerythrityl triallyl ether, pentaallylsucrose, divinylurea and divinylethyleneurea.

The copolymers contain, for example, from 99 to 1, preferably from 95 to 5 mol-% of N-vinylcarboxamides of the formula I and from 1 to 99, preferably from 5 to 95 mol-% of other monoethylenically unsaturated monomers copolymerizable therewith in polymerized form.

Polymers containing vinylamine units are prepared preferably starting from homopolymers of N-vinylformamide or from copolymers which are obtainable by copolymerization of N-vinylformamide-with vinyl formate, vinyl acetate, vinyl propionate, acrylonitrile, N-vinylcaprolactam, N-vinylurea, acrylic acid, N-vinylpyrrolidone or $C_1$–$C_6$-alkyl vinyl ethers and subsequent hydrolysis of the homo- or copolymers with formation of vinylamine units from the copolymerized N-vinylformamide units, the hydrolysis being, for example, from 0.1 to 100 mol-%.

The hydrolysis of the above-described polymers is carried out by the action of acids, bases or enzymes by known methods. Elimination of the group

 (II)

where $R^2$ has the meaning stated for $R^2$ in the formula I, from the polymerized monomers of the abovementioned formula I gives polymers containing vinylamine units of the formula

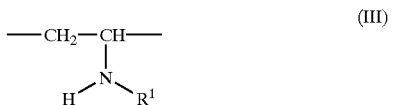 (III)

where $R^1$ has the meaning stated in formula I.

The homopolymers of the N-vinylcarboxamides of the formula I and their copolymers may be hydrolyzed to an extent of from 0.1 to 100, preferably from 1 to 99, mol %. In most cases, the degree of hydrolysis of the homo- and copolymers is from 5 to 95 mol %. The degree of hydrolysis of the homopolymers is equivalent to the content of vinylamine units in the polymers. In the case of copolymers which contain polymerized vinyl ester units, hydrolysis of the ester groups with the formation of vinyl alcohol units may occur in addition to the hydrolysis of the N-vinylformamide units. This is the case in particular when the hydrolysis of the copolymers is carried out in the presence of sodium hydroxide solution. Polymerized acrylonitrile units are likewise chemically modified in the hydrolysis. This gives, for example, amido groups or carboxyl groups. The homo- and copolymers containing vinylamine units may contain up to 20 mol % of amidine units, which are formed, for example, by reaction of formic acid with two neighboring amino groups or by intramolecular reaction of an amino group with a neighboring amido group, for example of a polymerized N-vinylformamide unit. The molar masses of the polymers containing vinylamine units are, for example, from 1000 to 10 million, preferably from 10,000 to 5 million (determined by light scattering). This molar mass range corresponds, for example, to K values of from 5 to 300, preferably from 10 to 250 (determined according to H. Fikentscher in 5% strength aqueous sodium chloride solution at 25° C. and at a polymer concentration of 0.5% by weight).

The polymers containing vinylamine units are preferably used in salt-free form. Salt-free aqueous solutions of polymers containing vinylamine units can be prepared, for example, from the salt-containing polymer solutions described above with the aid of dialysis or ultrafiltration through suitable membranes with separation of, fox example, from 1000 to 500,000, preferably from 10,000 to 300,000, Dalton. The aqueous solutions of amino- and/or ammonium-containing other polymers described below can also be obtained in salt-free form with the aid of dialysis or ultrafiltration. Ultrafiltration through membranes having the abovementioned separation limits results not only in removal of salts, which are formed, for example, in the hydrolysis of polymers containing N-vinylformamide units with acids or bases, but also in fractionation of the polymers, so that polymers having a narrower molar mass distribution of $M_w/M_n$ are obtained. The fractions obtained as residue in the ultrafiltration and comprising polymers having a narrow distribution give, on reaction with reactive sizes, reaction products which generally have higher efficiency than reaction products which are formed in the reaction of unfractionated polymers of the same composition with reactive sizes.

Suitable polyalkylenepolyamines have, for example, molar masses of at least 1000. Preferably used polyalkylenepolyamines are polyethyleneimines; they are prepared, for example, by polymerizing ethyleneimine in an aqueous solution in the presence of acid-eliminating compounds, acids or Lewis acids. Polyethyleneimines have, for example, molar masses of up to 2 million, preferably from 2000 to 1,000,000. Polyethylenimines having molar masses of from 5000 to 800,000 are particularly preferably used.

Suitable amino- and/or ammonium-containing polymers are also polyamidoamines, which are obtainable, for example, by condensation of dicarboxylic acids with polyamines. Suitable polyamidoamines are obtained, for example, by reacting dicarboxylic acids of 4 to 10 carbon atoms with polyalkylenepolyamines which contain from 3 to 10 basic nitrogen atoms in the molecule. Suitable dicarboxylic acids are for example, succinic acid, maleic acid, adipic acid, glutaric acid, suberic acid, sebacic acid and terephthalic acid. In the preparation of the polyamidoamines, it is also possible to use mixtures of dicarboxylic acids as well as mixtures of a plurality of polyalkylenepolyamines. Suitable polyalkylenepolyamines are, for example, diethylenetriamine, triethylenetetramine, tetraethylenepentamine, dipropylenetriamine, tripropylenetetramine, dihexamethylenetriamine, aminopropylethylenediamine and bis-aminopropylethylenediamine. For the preparation of the polyamidoamines, the dicarboxylic acids and polyalkylenepolyamines are heated to relatively high temperatures, for example from 120 to 220° C., preferably 130 to 180° C. The water formed in the condensation is removed from the system. Lactones or lactams of carboxylic acids of 4 to 8 carbon atoms can, if required, also be used in the condensation. For example from 0.8 to 1.4 mol of a polyalkylenepolyamine are used per mole of a dicarboxylic acid.

Further amino-containing polymers are ethyleneimine-grafted polyamidoamines. They are obtainable from the polyamidoamines described above by reaction with ethyleneimine in the presence of acids or Lewis acids, such as sulfuric acid or boron trifluoride etherates, at, for example, from 80 to 100° C. For example, from 1 to 100 parts by weight of ethyleneimine are grafted on per 100 parts by weight of a polyamidoamine. Uncrosslinked polyamidoamines which may be grafted with ethyleneimine are preferably used. Compounds of this type are described, for example, in DE-B-24 34 816.

The uncrosslinked or crosslinked polyamidoamines, which may additionally be grafted with ethyleneimine before the crosslinking, are also suitable as starting material for the preparation of the fixing agents. The crosslinked, ethyleneimine-grafted polyamidoamines are water-soluble and have viscosities from 100 to 2000 mPas, eg. in 25% strength aqueous solution at 20° C.

Other suitable amino- and/or ammonium-containing polymers for the preparation of fixing agents are polydiallyldimethylammonium chlorides. Polymers of this type are also known. Both homo- and copolymers of diallyldimethylammonium chloride may be used. Suitable comonomers are primarily acrylamide and/or methacrylamide. The copolymerization can be carried out using any desired monomer ratio. The K value of the homo- and copolymers of diallyldimethylammonium chlorides [sic] is at least 30, preferably from 95 to 180.

Other suitable polymers for the preparation of the fixing agents are copolymers of, for example, from 1 to 99, preferably from 30 to 70, mol % of acrylamide and/or methacrylamide and from 99 to 1, preferably from 70 to 30, mol % of dialkylaminoalkylacrylamide and/or dialkylaminoalkylmethacrylamide. The basic acrylamides and methacrylamides are likewise preferably present in a form neutralized with acids or in quaternized form. Examples are N-trimethylammoniumethylacrylamide chloride,
N-trimethylammoniumethylmethacrylamide chloride,
trimethylammoniumethylacrylamide methosulfate,
trimethylammoniumethylmethacrylamide methosulfate,
N-ethyldimethylammoniumethylacrylamide ethosulfate,
N-ethyldimethylammoniumethylmethacrylamide ethosulfate,
trimethylammoniumpropylacrylamide chloride,
trimethylammoniumpropylmethacrylamide chloride,
trimethylammoniumpropylacrylamide methosulfate,
trimethylammoniumpropylmethacrylamide methosulfate and
N-ethyldimethylammoniumpropylacrylamide ethosulfate.
Trimethylammoniumpropylmethacrylamide chloride is preferred.

Other suitable starting materials for the preparation of the fixing agents are copolymers of from 1 to 99, preferably from 30 to 70, mol % of acrylamide and/or methacrylamide and from 99 to 1, preferably from 70 to 30, mol % of dialkylaminoalkyl acrylates and/or methacrylates, eg. copolymers of acrylamide and N,N-dimethylaminoethyl acrylate. Basic acrylates are preferably present in a form neutralized with acids or in quaternized form. Quaternization may be effected, for example, with methyl chloride or with dimethyl sulfate.

The cationic polymers have, for example, K values of from 30 to 300, preferably from 130 to 180 (determined according to H. Fikentscher in 5% strength aqueous sodium chloride solution at 25° C. and at a polymer concentration of from 0.5% by weight). At a pH of 4.5, they have, for example, a charge density of at least 4 meq/g of polyelectrolyte.

Polyallylamines are also suitable cationic polymers which have amino and/or ammonium groups. Polymers of this type are obtained by homopolymerization of allylamine, preferably in a form neutralized with acids or in quaternized form, or by copolymerization of allylamine with other monoethylenically unsaturated monomers which are described above as comonomers for N-vinylcarboxamides.

The amino- and/or ammonium-containing polymers are modified by reaction with reactive sizes for paper. For the purposes of the invention reactive sizes for paper are, for example, alkyldiketenes, alkenylsuccinic anhydrides, alkyl isocyanates or chloroformic esters of fatty alcohols, ester alcohols and/or carboxamido alcohols. Alkyldiketenes suitable for the preparation of the fixing agents may be characterized, for example, with the aid of the following formula:

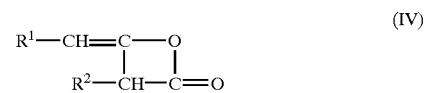

(IV)

where $R^1$, $R^2$=H, $C_1$–$C_{22}$-alkyl, $C_{10}$–$C_{22}$-alkenyl, $C_4$–$C_8$-cycloalkyl, aryl or aralkyl.

$R^1$ and $R^2$ in the formula IV are preferably identical or different alkyl or alkenyl radicals of 14 to 22 carbon atoms. These compounds are used as they are or in the form of aqueous dispersions for the preparation of the fixing agents.

Preferred aqueous dispersions of reactive sizes contain, as reactive sizes, $C_{14}$–$C_{22}$-alkyldiketenes and, as protective colloids, reaction products of polymers containing vinylamine units with diketenes of the formula IV.

Such dispersions contain, for example, stearyldiketene, lauryldiketene, palmityldiketene, oleyldiketene, behenyldiketene or mixtures thereof as sizes and reaction products of hydrolyzed polymers of N-vinylformamide with stearyldiketene, lauryldiketene, palmityldiketene, oleyldiketene, behenyldiketene or mixtures thereof as protective colloids.

The aqueous dispersions of reactive sizes can, if required, be stabilized with other reactive colloids. Examples of suitable protective colloids are the conventional water-soluble or water-dispersible polymeric protective colloids, eg. cationic, amphoteric and/or anionic starch. The aqueous dispersions of reactive sizes preferably contain from 10 to 25% by weight of reactive size and preferably from 1 to 3.5% by weight of at least one protective colloid or dispersant, for example ligninsulfonic acid, condensates of naphthalenesulfonic acid and formaldehyde, sulfonated polystyrene, $C_{10}$–$C_{22}$-alkylsulfonic acids, $C_{10}$–$C_{22}$-alkylsulfuric acids and salts and mixtures of the stated compounds. They can, if required, contain further assistants, such as mono-, di- and triglycerides, fatty acids and their esters or amides, which are known in the literature as stabilizers for alkyldiketene dispersions.

Other suitable reactive sizes are cyclic dicarboxylic anhydrides of the formula

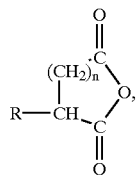

(V)

where

R is $C_5$–$C_{22}$-alkyl or $C_5$–$C_{22}$-alkenyl and n is 1 or 2.

Examples of anhydrides of the formula V are decenylsuccinic anhydride, octenylsuccinic anhydride, dodecenylsuccinic anhydride and n-hexadecenylsuccinic anhydride.

Further suitable reactive sizes are organic isocyanates, such as $C_{12}$–$C_{36}$-alkyl isocyanates, for example dodecyl isocyanate, octadecyl isocyanate, tetradecyl isocyanate, hexadecyl isocyanate, eicosyl isocyanate, docosyl isocyanate, and decyl isocyanate.

Further suitable reactive sizes are chloroformic esters of ester alcohols, fatty alcohols and/carboxamido [sic] alcohols. Such reactive sizes are described, for example, in DE-A-33 01. The abovementioned sizes, such as alkyldiketenes, cyclic carboxylic anhydrides and organic isocyanates, are described in DE-B-27 10 061.

For the preparation of the fixing agents, the amino- and/or ammonium-containing polymers described above are reacted with the compounds known as reactive sizes for paper in a weight ratio of polymer to reactive size of from 15,000:1 to 1:5, preferably from 1000:1 to 1:1. Preferably used fixing agents are prepared by reacting uncrosslinked polymers selected from the group consisting of the polymers containing vinylamine units and/or polyethyleneimines with $C_{14}$–$C_{22}$-alkyldiketenes, cyclic $C_5$–$C_{22}$-alkylsuccinic anhydrides or $C_5$–$C_{22}$-alkenylsuccinic anhydrides. The reaction of the amino-containing polymers with the substances known as reactive sizes is usually carried out by thoroughly mixing the reactive size or solution or aqueous dispersion of a reactive size with an aqueous solution of an amino and/or ammonium-containing polymer at, for example, from 20 to 100° C., preferably from 40 to 70° C., and allowing the reaction to continue until the reactive size used has completely reacted. The reaction products thus obtained are used as fixing agents in the production of paper, board and cardboard. The fixing agents are used in an amount of, for example, from 0.01 to 2, preferably from 0.02 to 1, % by weight, based on dry paper stock. Surprisingly, with the fixing agents used according to the invention, the fixation of water-soluble and water-insoluble interfering substances in the paper is substantially improved compared with the prior art.

In a preferred embodiment of the process, the drainage of the parer stock is additionally carried out in the presence of a retention aid. In addition to anionic retention aids or nonionic retention aids, such as polyacrylamides, cationic polymers are preferably used as retention aids and as drainge aids. This results in a significant improvement in the runnability of the paper machines. All products commercially available for this purpose can be used as cationic retention aids. These are, for example, cationic polyacrylamides, polydiallyldimethylammonium chlorides, polyethyleneimines, polyamines having a molar mass of more than 50,000, polyamines which may be modified by grafting on ethyleneimine, polyetheramides, polyvinylimidazoles, polyvinylpyrrolidines, polyvinylimidazolines, polyvinyltetrahydropyrines, poly (dialkylaminoalkyl vinyl ethers), poly(dialkylaminoalkyl (meth)acrylates) in protonated or quaternized form and polyamidoamines of adipic acid and polyalkylenepolyamines such as diethylenetriamineamine [sic], which are grafted with ethylenimine and crosslinked with polyethylene glycol dichlorohydrin ethers according to DE-B-24 34 816, or polyamidoamines which are reacted with epichlorohydrin to give water-soluble condensates, and copolymers of acrylamide or methacrylamide and dialkylaminoethyl acrylates or methacrylates, for example copolymers of acrylamide and dimethylaminoethyl acrylate in the form of a salt with hydrochloric acid or in the form quaternized with methyl chloride.

The cationic polymers which are used as retention aids have Fikentscher K values of at least 140 (determined in 5% strength aqueous sodium chloride solution at a polymer concentration of 0.5% by weight, at 25° C. and at a pH of 7).

The drainage of the paper stock in the presence of the fixing agents to be used according to the invention is preferably additionally effected in the presence of polymers containing vinylamine units ethyleneimine-grafted and crosslinked polyamidoamines polyacrylamides and/or polydiallyldimethylammonium chlorides as retention aids. The retention aids are preferably used in amounts of from 0.01 to 0.2% by weight, based on dry paper stock. The ratio of fixing agent to retention aid is, for example from 1:2 to 5:1. Compared with conventional combinations of fixing agents and cationic retention aids, improved retention and accelerated drainage of the paper stock are achieved by the novel process.

In the examples which follow, percentages are by weight unless stated otherwise. The K values were determined according to H. Fikentscher, Cellulose-Chemie, Vol. 13, (1932) 58–64 and 71–74 in 5% aqueous sodium chloride solution at 25° C. and at a pH of 7 and at a polymer concentration of 0.5% by weight. The molar masses of the polymers were measured by light scattering.

The chemical oxygen demand (COD) was determined according to DIN 38 409. The light transmittance (optical transparency) of the white water was measured using a Dr Lange photometer at a wavelength of 588 nm. It is a measure of the retention of fines and fillers and is stated in %. The higher the value of the light transmittance, the better is the retention.

Preparation of the Fixing Agents

Fixing Agent 1

500 g of an aqueous polyethyleneimine solution having a solids content of 49% and an average molecular weight of 750,000 are initially taken in a 2 l flask equipped with a stirrer and a thermometer and are heated to 70° C. Thereafter, 1.78 g of stearyldiketene are added with thorough stirring and the mixture is then stirred for a further hour at 70° C., cooled to room temperature and brought to a pH of 7 by adding formic acid. A 49.1% strength aqueous solution having a viscosity of 754 mPas is obtained.

Fixing Agent 2

1000 g of an aqueous solution of polyvinylformamide having a polymer content of 16.5% are initially taken in a stirred apparatus equipped with a reflux condenser, a thermometer and a dropping funnel and are heated to 80° C. with thorough stirring. The K value of the polyvinylformamide is 87 (Mw=250,000, ≈2321 mmol of vinylformamide units.). 102 g (about 1275 mmol) of 50% strength aqueous sodium hydroxide solution are added dropwise in the course of 20 minutes. The reaction mixture is then stirred for a further hour at 80° C. After cooling to room temperature, the solution is freed from the sodium formate by dialysis and is concentrated by distillation. 1120 g of an aqueous polymer solution having a polymer content of 11.4% are obtained. The polymer contains 57 mol % of vinylamine units and 43 mol % of vinylformamide units.

600 g of the polymer solution described above are initially taken in a stirred apparatus, brought to pH 9 and heated to 80° C. As soon as this temperature has been reached, 4.40 g of stearyldiketene in the form of a melt are added dropwise. The mixture is then stirred for a further 2 hours at 80° C. and then cooled to room temperature. A 12% strength aqueous solution having a viscosity of 1065 mPas is obtained.

Fixing Agent 3

As described in the preparation of fixing agent 2, 1000 g of an aqueous polyvinylformamide solution having a polymer content of 16.5% by weight and a K value of the polymer of 87 are initially taken in a stirred apparatus and 204 g of 50% strength aqueous sodium hydroxide solution are added to eliminate the formyl groups from the polymer. The reaction time is 2 hours at 80° C. Thereafter, the solution is cooled to room temperature, freed from sodium formate by means of dialysis and concentrated by distillation. 1390 g of a polymer solution having a polymer content of 7.4% are obtained. The polymer is 95% hydrolyzed and thus contains 95% of vinylamine units and 5 mol % of vinylformamide units.

600 g of the polymer solution described above are brought to pH 9 and heated to 80° C. while stirring. As soon as this temperature has been reached, 4.60 g of stearyldiketene in the form of a melt are added. The mixture is then stirred for a further 2 hours at 80° C. and then cooled to room temperature. An 8% strength aqueous solution having a viscosity of 912 mPas is obtained.

Fixing Agent 4

600 g of an aqueous polyethyleneimine solution having a solids content of 49% and an average molecular weight of 750,000 are initially taken in a 2 l flask equipped with a stirrer and a thermometer and heated to 50° C. Thereafter, 56 g of an aqueous 2% dispersion of octadecenylsuccinic anhydride are added with thorough stirring, and the reaction mixture is stirred for a further hour at 50° C. Thereafter, the mixture is cooled and formic acid is added until the pH is 7. A 44.9% strength aqueous solution having a viscosity of 1045 mPas is obtained.

Fixing Agent 5

600 g of an aqueous polyethyleneimine solution having a solids content of 49% and an average molecular weight of 750,000 are initially taken in a 2 l flask equipped [lacuna] stirrer and thermometer and are heated to 50° C. As soon as this temperature has been reached, 17.8 g of a 10% aqueous dispersion of stearyldiketene are added with thorough stirring, and the reaction mixture is stirred for a further hour at 50° C. Thereafter, it is cooled and brought to pH 7 by adding formic acid. A 47.5% strength aqueous solution having a viscosity of 598 mPas is obtained.

Comparative Example 1 (According to Example 1 of WO-A-94/12560)

Fixing Agent 6

799 g of an anhydrous polyethyleneimine having an average molecular weight of 25,000 are initially taken in a flask equipped with a stirrer, thermometer and means for working under nitrogen and are heated to 140° C. under a nitrogen stream. 69 g of propionic acid are added in the course of 30 minutes. The temperature is then increased to 180° C. The water formed in the reaction is continuously separated off over a period of 5 hours. 200 g of the polymer prepared in this manner are diluted with 700 ml of water and heated to 70° C. 36.5 ml of a 21% strength aqueous solution of a bischlorohydrin polyethylene glycol having a molecular weight of 400 are then added a little at a time in the course of 3 hours. The reaction mixture is stirred for a further hour at 70° C. after the addition of the crosslinking agent and then brought to pH 8 by adding 85 g of an 85% strength formic acid. 1018 g of a 20.7% strength polymer solution having a viscosity of 884 mPas are obtained.

EXAMPLES

Examples 1 to 5

An aqueous fiber suspension comprising TMP (thermomechanical pulp) and having a consistency of 2% was divided into equal portions and an aqueous solution of 5% humic acid was added as an interfering substance in each case.

The amounts of fixing agents 1 to 6 shown in Table 1 and in addition 0.2% by weight, based on dry fiber, of a cationic polyacrylamide having a K value of 240, as a retention aid, were added to each of the samples of this pulp. After thorough mixing and filtration of the flocculated paper stock, the absorbance of the alkaline filtrate is determined at a wavelength of 340 nm. The results are shown in Table 1.

TABLE 1

| Example | 0.05% | Absorbance | 0.1% | Absorbance |
|---|---|---|---|---|
| 1 | Fixing agent 1 | 0.30 | Fixing agent 1 | 0.19 |
| 2 | Fixing agent 2 | 0.38 | Fixing agent 2 | 0.16 |
| 3 | Fixing agent 3 | 0.30 | Fixing agent 3 | 0.17 |
| 4 | Fixing agent 4 | 0.40 | Fixing agent 4 | 0.22 |
| 5 | Fixing agent 5 | 0.20 | Fixing agent 5 | 0.27 |
| Comp.-Example 1 | Fixing agent 6 | 0.49 | Fixing agent 6 | 0.26 |

Comparative Example 2

The paper stock containing formic acid was filtered directly, ie. in the absence of fixing agents and retention aids. The absorbance of the filtrate was 1.20.

Examples 6 to 10

An aqueous fiber suspension comprising TMP (thermomechanical pulp) and having a consistency of 2% was divided into equal portions, and a wood extract (2 ml/75 ml of TMP) as an interfering substance was added in each case. The amounts of fixing agents shown in Table 2, followed by 0.2%, based on dry fiber, of a commercial cationic polyacrylamide having a K value of 240, as a retention aid were added to each of the samples of this pulp. After thorough mixing and filtration of the flocculated paper stock, the absorbance of the alkaline filtrate was determined at 340 nm. The results are shown in Table 2.

TABLE 2

| Example | Fixing agent | Metering of ... Fixing agent (calculated as 100%) | | | |
|---|---|---|---|---|---|
| | | 0% | 0.03% | 0.05% | 0.1% |
| 6 | 1 | 1.20 | 0.37 | 0.35 | 0.30 |
| 7 | 2 | 1.21 | 0.33 | 0.32 | 0.22 |
| 8 | 3 | 1.18 | 0.42 | 0.35 | 0.28 |
| 9 | 4 | 1.20 | 0.44 | 0.39 | 0.29 |
| 10 | 5 | 1.20 | 0.28 | 0.24 | 0.20 |
| Comp. Example 3 | 6 | 1.19 | 0.45 | 0.42 | 0.33 |

Comparative Example 4

The paper stock described in Examples 6 to 10 is drained without further additives. The absorbance of the alkaline filtrate was 0.51.

Examples 11 to 15

0.15 g/l of an aqueous dispersion of coated waste was added as interfering substance (sticky interfering substance) to samples of an aqueous fiber suspension comprising TMP (thermomechanical pulp) and having a consistency of 2%. The amounts of fixing agents shown in Table 3 and 0.2%, based on dry fiber, of a commercial cationic polymer, having a K value of 240, as a retention aid, were then added to each of the samples of this pulp. After thorough mixing and filtration of the flocculated paper stock, the number of particles was determined in the filtrate with the aid of a laser optical method (cf. Nordic Pulp & Paper Research Journal, No. 1-1994, 9 (1994), pages 26 to 30, 36). The results are shown in the table.

TABLE 3

| Example | Fixing agent | Metering of ... % fixing agent (100%) | | | | |
|---|---|---|---|---|---|---|
| | | 0% | 0.01% | 0.02% | 0.05% | 0.1% |
| 11 | 1 | 100 | 77 | 63 | 18 | 2 |
| 12 | 2 | 100 | 69 | 42 | 27 | 7 |
| 13 | 3 | 100 | 78 | 47 | 14 | 8 |
| 14 | 4 | 100 | 89 | 52 | 24 | 10 |
| 15 | 5 | 100 | 68 | 45 | 19 | 7 |
| Comp. Example 5 | 6 | 100 | 91 | 61 | 33 | 62 |

We claim:

1. A process for the production of paper, board and cardboard, comprising:
   draining a paper stock containing interfering substances in the presence of an uncrosslinked fixing agent which is a reaction product prepared by reacting an amino- or ammonium-containing polymer selected from the group consisting of:
   a polymer containing vinylamine units,
   a polyalkylenepolyamine,
   a polyamidoamine,
   an ethyleneimine-grafted polyamidoamine,
   a polydiallyldimethylammonium chloride,
   a polymer containing dialkylaminoalkylacrylamide units or dialkylaminomethacrylamide units,
   a polyallylamine, and
   a dicyandiamide and formaldehyde condensate,
   with a reactive size for paper in a weight ratio of polymer to reactive size ranging from 15,000:1 to 1:5, the uncrosslinked fixing agent fixing water-soluble interfering substances, colloidal interfering substances and water-insoluble tacky impurities to the fibers of the paper stock.

2. The process as claimed in claim 1, wherein the uncrosslinked fixing agent is a reaction product prepared by reacting amino-containing compounds with a reactive sizing agent in a weight ratio ranging from 1,000:1 to 1:1.

3. The process as claimed in claim 1, wherein said fixing agent is employed in an amount ranging from 0.01 to 2% by weight relative to the weight of dry paper stock.

4. The process as claimed in claim 1, wherein said reactive size is a compound selected from the group consisting of an alkyldiketene, an alkenylsuccinic anhydride, an alkyl isocyanate and a chloroformic ester of a fatty alcohol, an ester alcohol or a carboxamido alcohol.

5. The process as claimed in claim 1, wherein said drainage of said paper stock is additionally conducted in the presence of a retention aid.

6. The process as claimed in claim 1, wherein said fixing agent is a reaction product prepared by reacting:
   a polymer containing vinylamine units, or
   a polyethyleneimine
   with a $C_{14}$–$C_{22}$-alkyldiketene, a cyclic $C_5$–$C_{22}$-alkylsuccinic anhydride or a $C_5$–$C_{22}$-alkenylsuccinic anhydride.

7. The process as claimed in claim 1, wherein the draining of the paper stock is additionally conducted in the presence of:
   a polymer containing vinylamine units,
   an ethyleneimine-grafted and crosslinked polyamidoamine,
   a polyacrylamide, or
   a polydiallyldimethylammonium chloride as a retention aid.

* * * * *